UNITED STATES PATENT OFFICE.

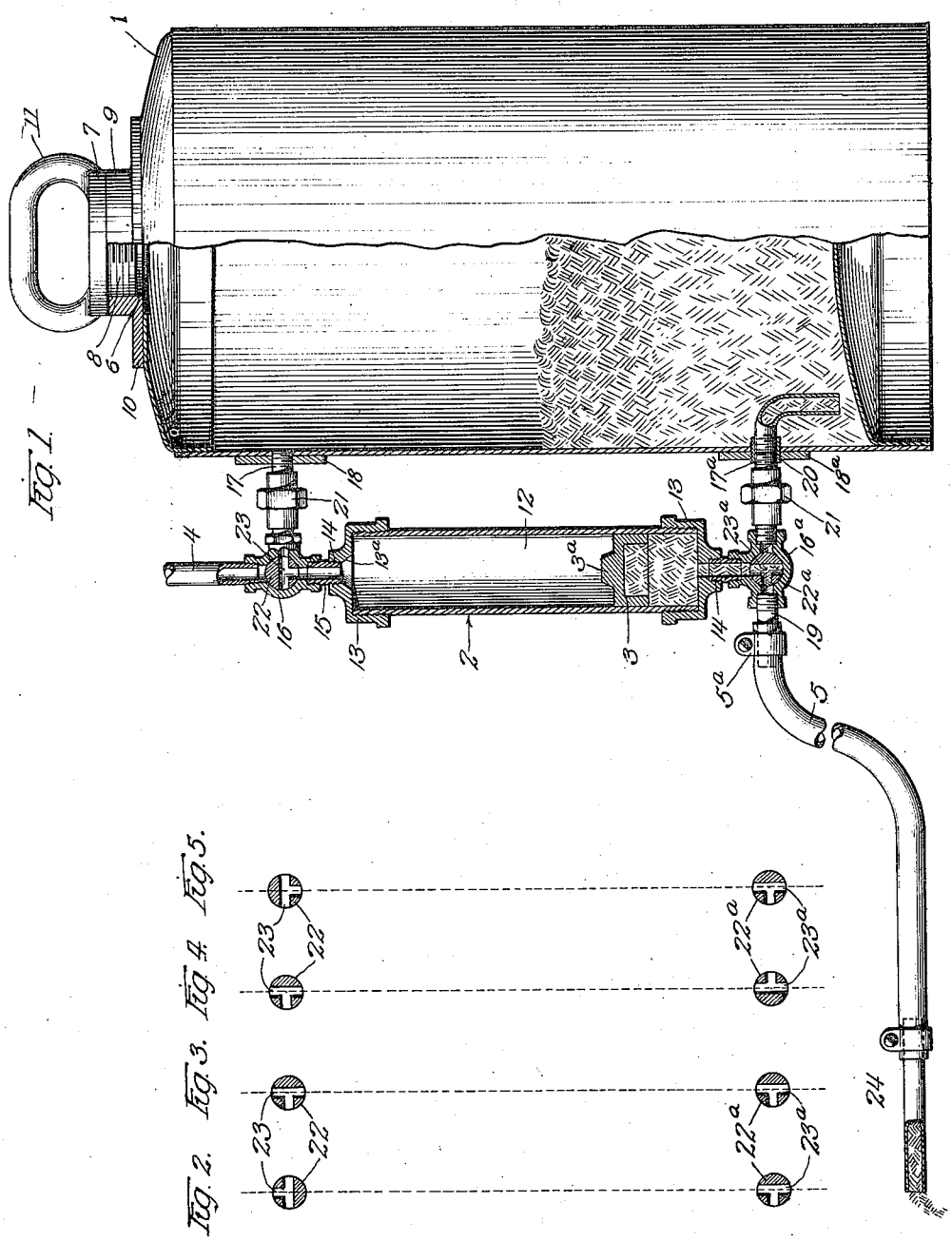

LUCIEN I. YEOMANS, OF CHICAGO, ILLINOIS, ASSIGNOR TO MANN CORPORATION, OF KANKAKEE, ILLINOIS, A CORPORATION OF ILLINOIS.

MEASURING AND DISCHARGING APPARATUS.

1,425,735.   Specification of Letters Patent.   Patented Aug. 15, 1922.

Application filed August 11, 1917. Serial No. 185,638.

*To all whom it may concern:*

Be it known that I, LUCIEN I. YEOMANS, a citizen of the United States, residing at Chicago, in the county of Cook and State of Illinois, have invented certain new and useful Improvements in Measuring and Discharging Apparatus, of which the following is a specification.

The invention relates to a measuring and discharging apparatus which is adapted more particularly for use in garages, automobile service stations, and the like, in the supplying of non-fluid lubricants such as are used in the transmission and differential casings of automobiles; and the general object of the invention is to provide an apparatus for supplying such lubricants in definite quantities, as in pints, or other unit of measurement, and for delivering the lubricant directly to the part or parts to be filled.

A more specific object of the invention is to provide a simple, compact and accurate measuring and discharging apparatus of the type set forth.

The objects of the invention thus generally stated, together with other and ancillary advantages, may be attained by means of a tank or other closed receptacle adapted to receive and hold the grease to be supplied, a measuring receptacle or cylinder having a discharge-tube leading therefrom, said tank and cylinder being in valve-controlled communication with each other and a source of air-pressure supply; whereby air may first be forced into the tank, which has been partially filled with grease, and the grease forced at will from the tank into the measuring cylinder; whereupon air may be admitted into the cylinder to force the grease therein out through the discharge-tube.

A preferred embodiment of the invention is illustrated in the accompanying drawings forming part hereof, in which Figure 1 is a fragmental side elevation of the apparatus, partly in section. Figs. 2 to 5, inclusive, are sectional views of the valve members detached, showing the relative positions thereof in the various stages of operation of the apparatus.

Similar numerals refer to similar parts throughout the drawings.

The device comprises an air-tight receptacle or tank 1 and a measuring cylinder 2, having a piston 3 operating freely therein, one end of the cylinder having valve-controlled communication with one end of the tank 1 and an air inlet pipe 4, and the other end of the cylinder having valve-controlled communication with the other end of the tank 1 and a discharge-tube 5.

The tank 1 is preferably made cylindrical in form, of sheet metal of sufficient strength to withstand a substantial degree of air-pressure, and in its upper wall is provided with an opening 6 for use in filling the tank. Said opening is adapted to be closed by means of a cap 7 having an inwardly offset annular flange 8 externally threaded and adapted to be screwed into a neck 9 surrounding the opening 6 and having an outer peripheral flange 10, welded or otherwise secured to the upper wall of the tank. The cap 7 is also preferably provided with a handle 11 formed integral therewith, for use in manipulating the cap and for carrying the device about as may be desired.

The measuring cylinder 2 is mounted at one side of the tank 1 and consists of a tubular body 12, each end of which is externally threaded to receive a cap 13 having a central screw-threaded opening 14 therein for receiving a nipple 15. The nipple, leading from the upper end of the cylinder, is in turn screw-threaded into a T-fitting 16 which is also connected with the air-supply pipe 4 and a connecting air-pipe 17 screw-threaded through a reinforcing plate 18 and communicating with the upper end of the tank, said plate being secured to the side of the tank as by welding. The nipple leading from the lower end of the cylinder is screw-threaded into a T-fitting 16$^a$ which is also connected with a pipe 17$^a$ leading from the lower end of the tank 1, and a nipple 19 which in turn is suitably connected to the discharge tube 5 as by means of a sectional clamp 5$^a$. The inner end of the pipe 17$^a$ extends into the tank 1 through a bushing 20, entered through a reinforcing plate 18$^a$ secured to the outer side of the tank, said pipe having a screw-threaded connection with the bushing 20 and having its inner end extending into the tank and bent downwardly to a point near the bottom thereof.

It will be apparent that the connecting pipes 17 and 17$^a$ serve to support the cylinder 2 at the side of the tank, in addition to their function as connecting pipes, and preferably these pipes are provided with polygonal heads or nuts 21 between their ends to facilitate their manipulation in assembling the apparatus.

The T-fittings 16 and 16ᵃ are each provided with a valve member 22 and 22ᵃ respectively, fitting neatly therein. Said valve member 22 is provided with suitable ports 23 adapted to establish communication between the upper end of the tank 1 and either the pipe 4 or the upper end of the cylinder 2, or between the pipe 4 and the upper end of said cylinder; and the valve member 22ᵃ is provided with suitable ports 23ᵃ adapted to establish communication between the lower end of the cylinder 2 and either the lower end of the tank 1 or the discharge-tube 5.

In the operation of the apparatus, the tank having been partially filled with grease through the opening 6, the valve members 22 and 22ᵃ are turned to the position shown in Fig. 2 and air is admitted through the pipe 17 into the upper end of the tank 1 to charge the same, the pipe 17ᵃ in the lower end of the tank being closed. Thereupon the valve members are turned into the inoperative positions shown in Fig. 3, in which the tank is closed against the escape of air as well as grease. When it is desired to furnish a supply of grease to a customer, the valve members are turned to the position shown in Fig. 4 and the compressed air in the tank forces a quantity of grease out through the pipe 17ᵃ and into the cylinder 2 through its lower end, the air in the cylinder above the piston 3 being free to escape from the upper end of the cylinder through the air-supply pipe 4, which has been disconnected from the source of supply. And finally, the valve members are turned to the position shown in Figs. 1 and 5 in which air is admitted from the tank to force the piston downwardly in the cylinder, and the piston in turn forces the grease therein outwardly through the discharge tube 5.

The piston 3, which operates freely within the cylinder 2, is preferably cup-shaped in order to more effectively engage with the grease to force it from the cylinder; and the upper surface of the piston is preferably provided with a central conical projection 3ᵃ adapted to engage in a correspondingly shaped seat 13ᵃ in order to prevent the escape from the cylinder of any grease that may have leaked past the piston when the cylinder was being filled.

The discharge-tube 5 is preferably a flexible one so that it may be readily directed to the desired filling openings in the machine, and the free end of the tube may be provided with a short pipe or nozzle 24 in order to facilitate the discharge of grease into said filling openings.

It will be apparent that I have provided a very convenient and practical method of and apparatus for handling grease, it being evident that not only may the grease be supplied in definite quantities but it may be conveniently delivered directly to the particular part of the machine desired, thus eliminating a waste of time and energy in the filling operation and a waste of grease in transferring it from one receptacle to another.

I claim as my invention:

An apparatus for measuring and discharging grease or the like including a closed container, a measuring receptacle having a piston therein, an air inlet pipe, a grease outlet, a valve casing connected with one end of the measuring receptacle, the air-supply pipe and one end of the container, and a valve casing connected with the other end of the measuring receptacle, the grease outlet and the opposite end of the container, each of said valve casings having a valve member therein operable to establish communication between any two of its connections.

In testimony whereof, I have hereunto set my hand,

LUCIEN I. YEOMANS.